United States Patent

Paasonen et al.

[11] Patent Number: 5,601,920
[45] Date of Patent: Feb. 11, 1997

[54] COVERED ROLL AND A METHOD FOR MAKING THE SAME

[75] Inventors: Jan A. Paasonen, Kerava; Seppo A. Yliselä, Järvenpää, both of Finland

[73] Assignee: Stowe Woodward Licensco, Inc., Wilmington, Del.

[21] Appl. No.: 418,421

[22] Filed: Apr. 6, 1995

[51] Int. Cl.⁶ .................................................. B32B 9/00
[52] U.S. Cl. ......................... 428/375; 428/68; 428/71; 428/76; 428/155; 428/372; 428/377; 428/382; 428/383; 428/390; 428/425.8; 428/461; 427/195; 427/318; 427/358; 264/46.9; 264/225
[58] Field of Search ....................... 428/382, 375, 428/372, 377, 383, 389, 390, 461, 463, 462, 68, 71, 76, 155, 425.8; 264/46.9, 225; 427/195, 318, 358, 366

[56] References Cited

U.S. PATENT DOCUMENTS

| | | | |
|---|---|---|---|
| 3,800,381 | 4/1974 | Brafford | 29/132 |
| 4,258,089 | 3/1981 | Anderson et al. | 427/318 |
| 4,288,058 | 9/1981 | Inman | 249/134 |
| 4,309,803 | 1/1982 | Blaszak | 29/130 |
| 4,368,568 | 1/1983 | Watanabe | 29/130 |
| 4,576,845 | 3/1986 | Krotchko | 428/36 |
| 4,705,711 | 11/1987 | Perna | 428/141 |
| 4,760,232 | 7/1988 | Smith | 219/61 |
| 5,091,027 | 2/1992 | Watanabe | 156/172 |
| 5,376,448 | 12/1994 | Suzuki et al. | 428/382 |

FOREIGN PATENT DOCUMENTS

| | | | |
|---|---|---|---|
| 1260092 | 10/1989 | Japan | D21G 1/00 |
| 9409208 | 4/1994 | WIPO | D21F 3/08 |
| 9517298 | 6/1995 | WIPO | B29D 31/00 |

OTHER PUBLICATIONS

Paasonen, "The Role of Composite Roll Covers in Soft and Super Calendering" Oct. 1993.
Grenoble Atria World Trade Center Europole, (Atip Publication).

*Primary Examiner*—Patrick Ryan
*Assistant Examiner*—Abraham Bahta
*Attorney, Agent, or Firm*—Bell, Seltzer, Park & Gilbson, P.A.

[57] ABSTRACT

The problems caused by chemical and thermal shrinkage of hard roll covers, are reduced by the inclusion of one or more intermediate compressive layers between the metal roll and the outer cover, or "topstock". A compressive layer has the properties of being rigid enough to allow the cover to be applied to the roll, and compressible enough to buffer and absorb the stresses which occur as the cover is shrinking during processing.

In one embodiment, the intermediate compressive layer comprises a three dimensional fabric that is filled preferably with a thermoset resin system which cures at lower temperature than cover. In a second embodiment, the precise amount of shrinkage in the roll can be predetermined to a high enough degree of accuracy so that a depth for the fabric layer can be used to compensate for the amount of shrinkage, thereby eliminating the need for filling. In a third embodiment, the compressive layer is comprised of a wax material.

The problems caused by chemical and thermal shrinkage are further reduced through a method based on applying a polymeric cover layer over one or more intermediate compressive layers, curing at an elevated temperature, and, allowing the cover to shrink during curing or hardening.

27 Claims, 8 Drawing Sheets

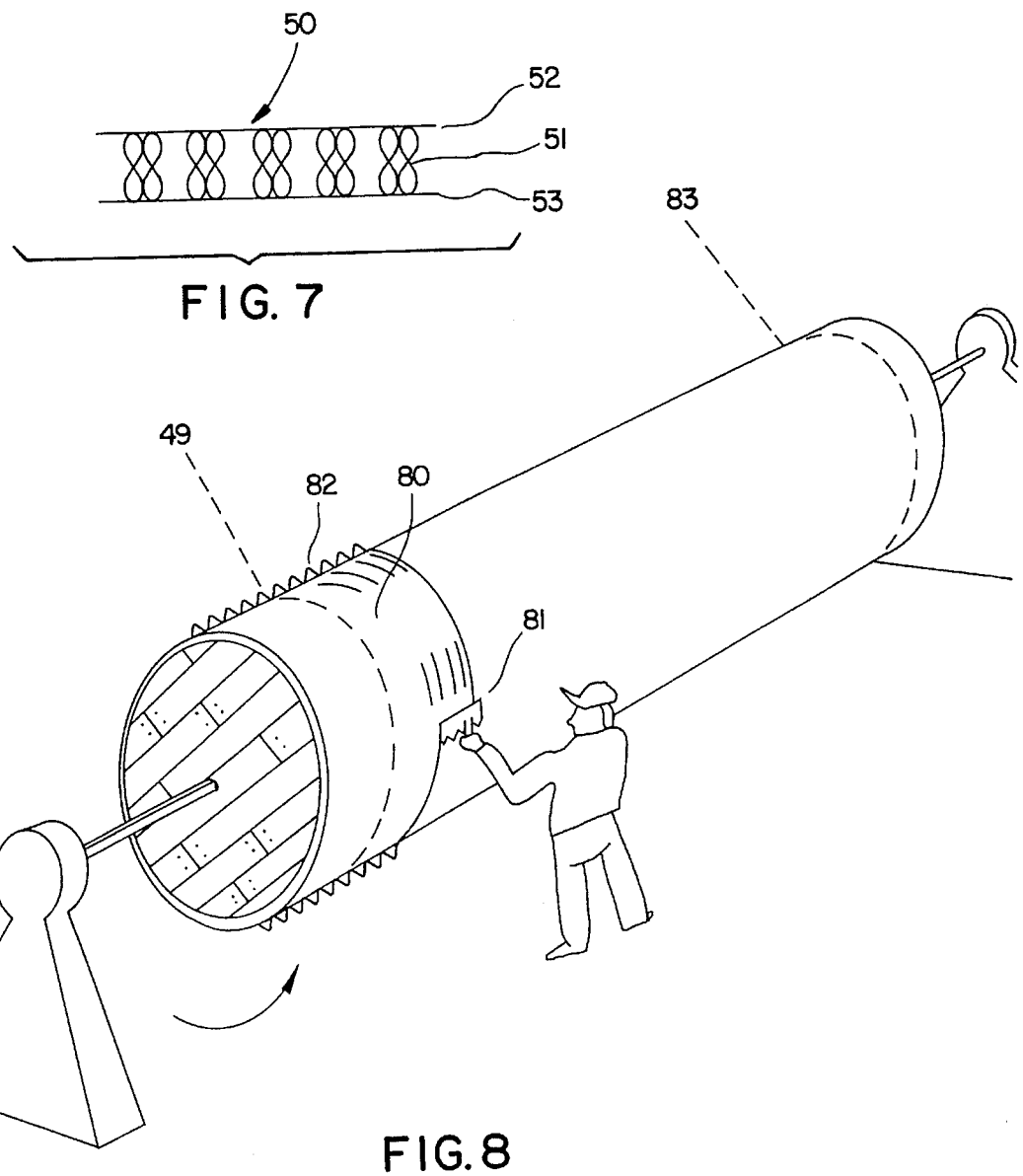

COVERED ROLL AND A METHOD FOR MAKING THE SAME

FIELD OF INVENTION

The field of this invention is covered rolls for industrial applications, and more particularly, rolls with relatively hard covers and methods of making such rolls.

BACKGROUND OF THE INVENTION

Covered rolls are used industrially in demanding environments where they are subjected to high dynamic loads and temperatures. For example, in a typical paper mill, large numbers of rolls are used not only for transporting the web sheet which becomes paper, but also for processing the web itself into finished paper. These rolls are precision elements of the system which are precisely balanced with surfaces that must be maintained at specific configurations.

One type of roll that is particularly subjected to high dynamic loads, is a calender roll. Calendering is employed to improve the smoothness, gloss, printability and thickness of the paper. The calendering section of a paper machine, is a section where the rolls themselves contribute to the manufacturing or processing of the paper rather than merely transporting the web through the machine.

In order to function properly, calender rolls must have extremely hard surfaces. For example, typically, the calender rolls are covered with an epoxy resin having a Shore D hardness within the range of 84–95 and an elastic modulus within the range of 1,000–10,000 MPa. Epoxy resins with such characteristics are cured at relatively high temperatures. Currently, such resins are cured at temperatures of 110° C.

It is well known that the higher the curing temperature, the higher will be the thermal resistance of the resulting cover. Furthermore, present day demands of the paper mill require rolls, particularly calender rolls, with higher thermal resistances. Thus, it would be desirable to produce covers for such rolls which can be cured at 150°–200° C. However, prior to the present invention, curing at such high temperatures caused so much stress that the cover tended to crack, rendering it unusable. A discussion of the physical chemistry of such a roll cover can be found in a paper entitled, "The Role Of Composite Roll Covers In Soft And Super Calendering," J. A. Paasonen, presented at the 46éme Congres Annuel Atip, Grenoble Atria World Trade Center Europole, October 20–22, 1993, the teachings of which are incorporated herein by reference.

Indeed, one important challenge to the manufacture of roll covers is to develop roll covers that can withstand the high residual stresses caused during manufacturing. Problems from residual stresses are most significant in the harder (higher stiffness) compounds and often result in cracking, delamination, and edge lifting.

Residual stresses not only promote the undesirable cracking and/or edge lifting tendency of the cover, but they often cause premature local failure or shorter than desired life cycles. This is especially true for high performance, hard polymeric roll coverings where the basic approach has been to tolerate a production level of residual stresses that are still acceptable from a products performance standpoint. Therefore, there is a need to develop methods of cover construction that reduce residual stresses in the product.

Consideration of residual stresses is especially critical during the manufacture of the roll cover. In particular, heating and curing processes must be given careful consideration as these conditions are the most significant factors in the development of such stresses. Residual stresses develop in polymer based covers as a result of the mismatch in thermal expansion properties between and/or among the cover materials and the core materials and from chemical shrinkage. Polymers typically have a coefficient of thermal expansion that is an order of magnitude greater than steel.

A suggestion to alleviate stresses from processing is to wrap a cover and bond it to an intermediate layer, which is processed and cured at a lower temperature level than the cover. Or cast the cover separately and bond it to the metal core at a lower temperature than the casting temperature. Thus, the thermal stresses that would arise from cooling down from the cure temperature would be reduced. Although, low temperature adhesives are available, these adhesives have poor high temperature strengths. In general, high cure temperatures are required for high temperature performance.

In addition, manufacturing costs would be raised by the necessity of having to produce the cover first as a separate cylindrical structure, and then, fitting it over the roll core at a lower processing temperature than was required for processing the cover. These casting methods require that an open cavity be created between the cover and the roll core which necessitate multiple process steps and the use of inner mandrels. Even if the cover is separately manufactured via a centrifugal casting method, additional costs and steps are required for an outer mold.

Another possible solution is to develop a cover material having a thermal shrinkage as close to the metallic core as possible. While composite structures may be developed with the expansion coefficients tailored to match the metal core, such methods are expensive and may not produce the desired thermomechanical response for the certain industrial applications. Thus, the need exists to develop methods to reduce the residual stress levels in current production materials.

SUMMARY OF THE INVENTION

The problems caused by chemical and thermal shrinkage of hard roll covers, are reduced in accordance with the present invention by the inclusion of at least one intermediate compressive layer between the metal roll and the outer cover, or topstock. This compressive layer is rigid enough to allow the cover to be applied to the roll while being compressible enough to buffer and absorb the stresses which occur as the cover is shrinking during processing.

The problems caused by chemical and thermal shrinkage are further reduced in accordance with the present invention through a method, which is based on applying a polymeric cover layer over an intermediate compressive layer, curing at an elevated temperature, and, allowing the cover to shrink during curing or hardening.

Accordingly, it is an object of the present invention to provide a roll with a very hard polymeric cover over a metal roll core.

It is a further object of this invention to provide coverings for industrial rolls which have a high degree of flexibility and high resistance to deformation causing stresses.

Another object of this invention is to provide rolls with hard polymeric coverings for industrial applications that are less expensive to manufacture than existing rolls.

Another object of this invention is to provide coverings for industrial rolls that reduce the transfer of frictional heat from one layer to the next.

Another object of this invention is to provide coverings for industrial rolls that have an extended service life.

Another object of this invention is to provide coverings for industrial rolls that minimize or eliminate rotational slippage between the cover and the roll.

Another object of this invention is to reduce the problems caused by chemical and thermal shrinkage that occur during the manufacture of a covered roll.

Another object of this invention is to reduce the problems caused by residual stresses that occur during the manufacture of the covered roll.

Another object of this invention is to provide an intermediate compressive layer between the metal roll and the outer cover, or topstock, to absorb the stress made by the cover on the metal roll.

It is another object of this invention to provide an intermediate compressive layer that is rigid enough to allow the cover to be applied to the roll while being compressible enough to buffer and absorb the stresses which occur as the cover is shrinking during processing.

It is another object of this invention to provide a covered roll having a multilayered structure of polymers or polymer composites, wherein one or more of the intermediate layers comprises a compressive layer.

Another of object of the invention is to provide an improved covered calender roll and method for making such a roll.

BRIEF DESCRIPTION OF THE DRAWING

FIG. 7 is a side view of a three dimensional compressive spacer fabric that may be employed in producing the present invention;

FIG. 8 is a perspective view of the manufacturing process in accordance with the present invention in which a layer of cement is applied with a trowel;

DESCRIPTION OF THE PREFERRED EMBODIMENT

At the outset, the covered roll and process for making the covered roll are described in their broadest overall aspects with a more detailed description following. High performance covered rolls are manufactured with reduced residual stresses through a method of applying a polymeric cover layer over an intermediate compressive layer. The purpose of the intermediate compressive layer is to absorb the thermal shocks and volume changes created during the manufacturing process.

Figure 1:
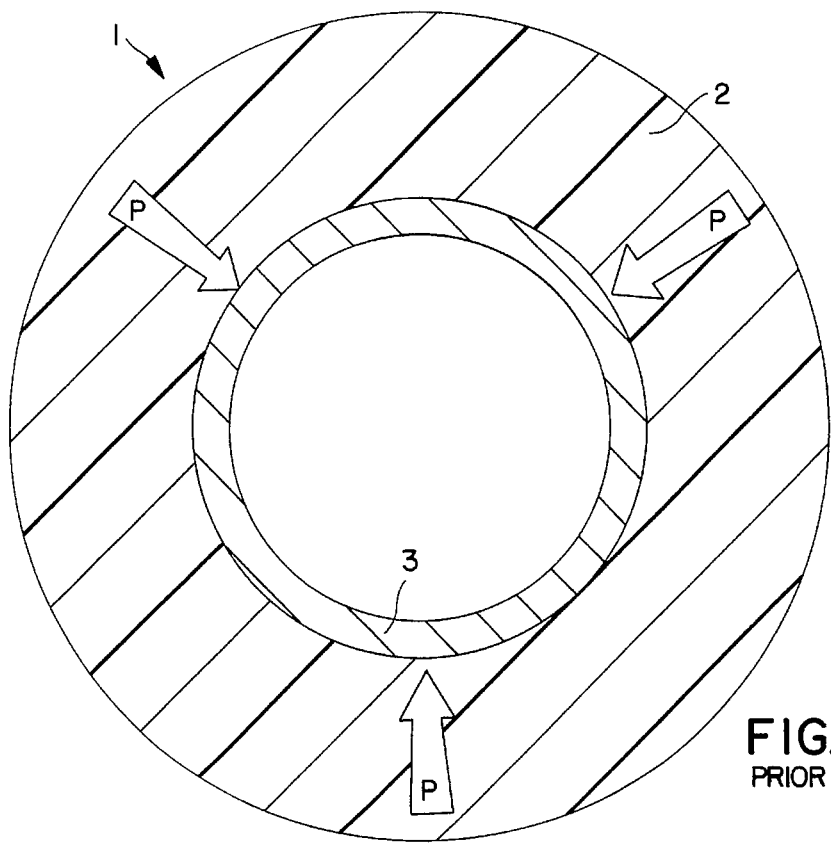
FIG. 1 is a cross sectional view of a prior art roll having a multi-layered covering and which diagrammatically shows the thermal and residual stresses within the cover directed towards the metal roll core.

With reference now to the drawing, FIG. 1 shows a covered roll 1 of the prior art. The arrows identified by the letter P in FIG. 1 indicate how the residual stresses and thermal shocks within the cover 2 are directed towards the metal roll core base 3. Although not indicated by arrows in FIG. 1, the residual stresses and thermal shocks occur in other directions within the role as well, such as, axially and radially. Eventually, these internal stresses lead to premature cracking of the roll.

Figure 2:
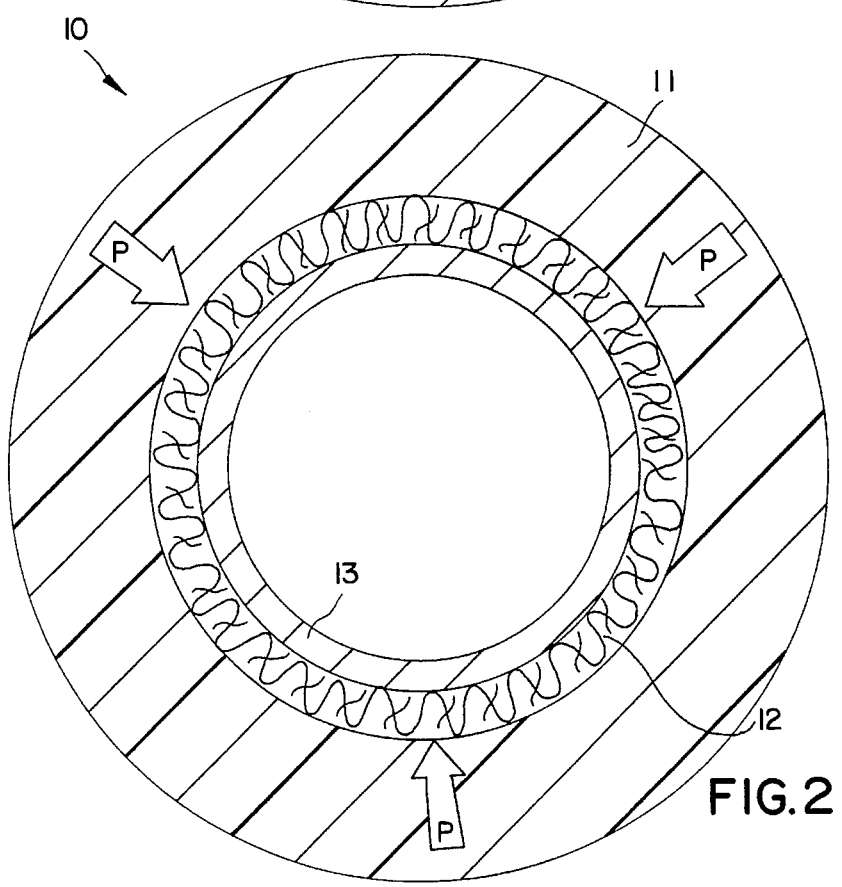
FIG. 2 is a cross-sectional view of the covered roll of the present invention for a covered roll having an intermediate compressive layer and which diagrammatically shows how the thermal and residual stresses within the cover are absorbed by an intermediate compressive layer.

FIG. 2 shows the preferred embodiment of the present invention where a covered roll 10 having a roll cover 11 is applied over an intermediate compressive layer 12 and a metal core base 13. The arrows identified by the letter P in FIG. 2 indicate how the intermediate compressive layer 12 allows the cover or roll cover 11 to shrink in the direction as shown during the hardening and cooling after thermal treatment of this layer. Although not indicated by arrows in FIG. 2, the compressive layer 12 allows for shrinkage and shock absorption in other directions within the role as well, such as, axially and radially.

In one embodiment of the present invention involving a secondary processing phase, the intermediate compressive layer 12 comprises a three dimensional spacer fabric that, in the final stages after cover production, is filled preferably with a thermoset resin system, which cures at lower temperature than cover 11. However, the intermediate layer 12 does not have to be filled. In one important embodiment, the precise amount of shrinkage in the roll can be predetermined with enough accuracy, so that, a depth for the intermediate fabric layer can be used to compensate for the amount of this shrinkage, and therefore, eliminate the need for filling. In yet another important embodiment of the present invention, the compressive layer is comprised of a wax material. Indeed, the compressive material can be a wax applied in the same manner as a resin, through a nozzle. At the completion of the manufactured roll, the wax can be removed by melting, and the resulting gap-layer filled utilizing conventional pressure casting methods. As will be apparent to one skilled in the art, more than one compressive layer may be used if the roll design so dictates.

In manufacturing a roll in accordance with the preferred embodiment and with reference to FIG. 2, a compressive layer 12 is applied to a metallic roll 13. Thereafter, a covering material 11 is placed over the compressive layer, and the covering material is fully cured. During the curing process, the residual stresses are absorbed by the compressive layer 12 and do not result in the roll cracking. After the cover 11 has been allowed to cure, the compressive layer 12 is filled with a polymer that cures at a lower temperature than the cover or cover 11. Thus providing strength to the roll 10 and reducing the likelihood of roll cover 11 cracking.

In the embodiments of the present invention employing a three dimensional spacer fabric as an intermediate compressive layer, the fabric is laid over the metal roll core with an adhesive cement. After curing, the surface of the spacer fabric layer is covered with a resin and baked to form an intermediate cover layer. Following the curing of the intermediate cover layer, the cover layer is applied. The cover is applied from a roll of resin impregnated textile on to the rotating roll. Then, the cover is cured allowing the resulting chemical and temperature changes to shrink the cover over the three dimensional spacer fabric layer.

Figure 3:
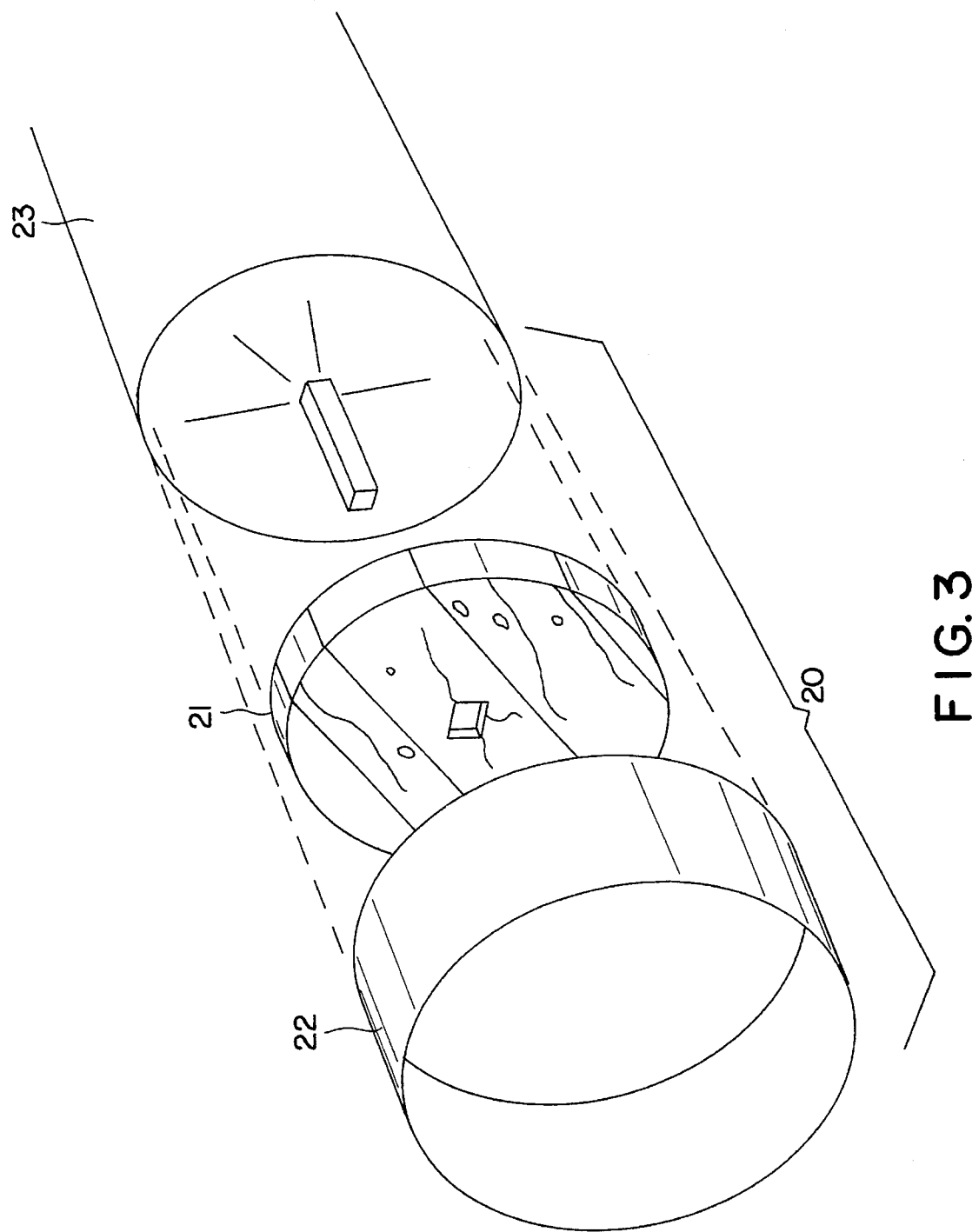
FIG. 3 is an exploded perspective view of a metal roll core base and an extender assembly used to assist in the manufacturing rolls in accordance with the present invention.
Figure 4:
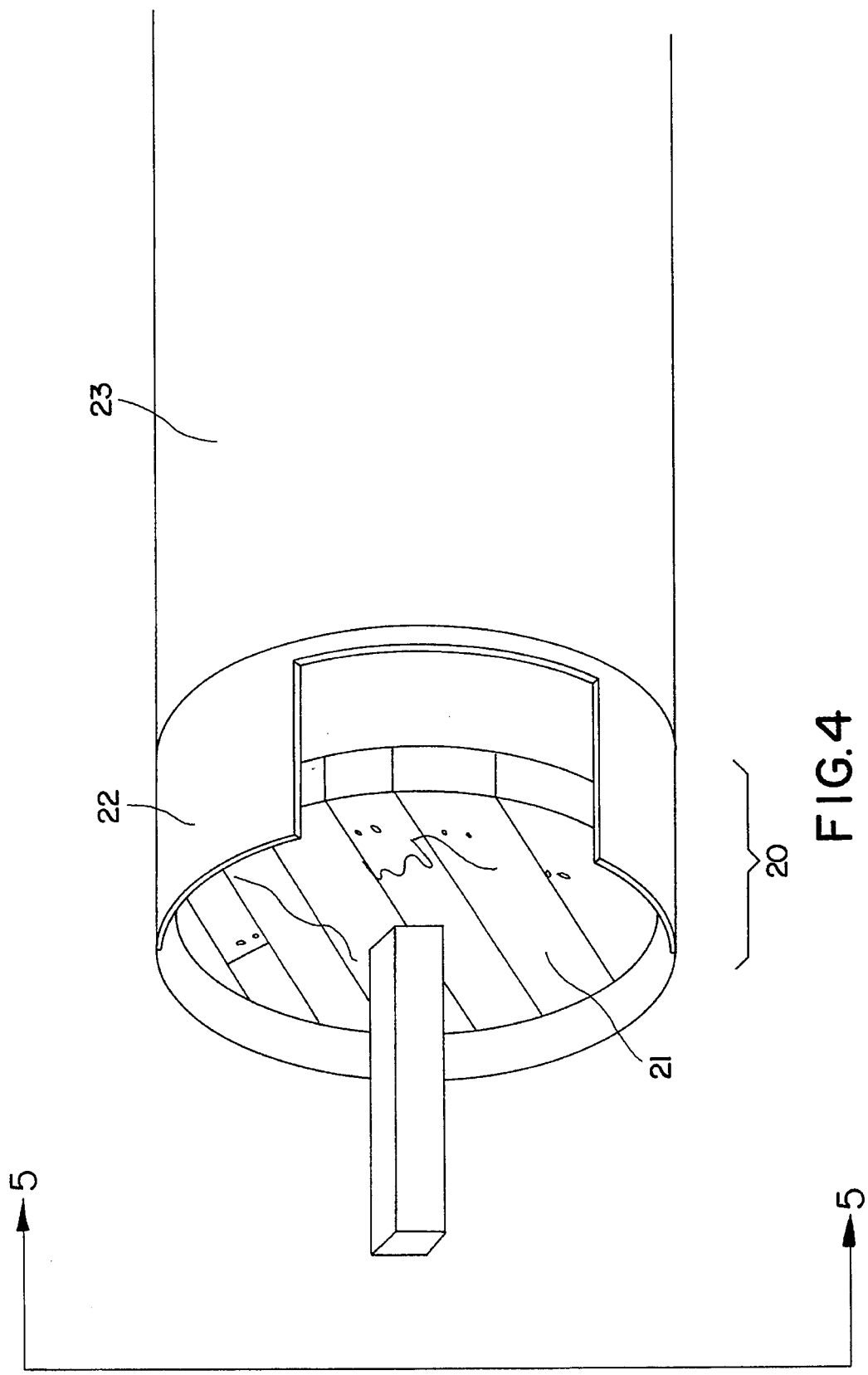
FIG. 4 is a perspective view of an extender assembly as it is fitted flush with the surface of a metal roll core base in accordance with the present invention.

To facilitate the filling of the compressive layer, FIG. 3 shows how an extender cap assembly 20 is placed on each end of the metal roll core base. The extender cap assembly comprises a annular ring 21 and an cylindrical section 22. Preferably, the annular ring 21 is made out of wood and the cylindrical section is of the same material as the roll core base 23. FIG. 4 is a perspective and cut-away view of the extender can assembly 20 in place on one end of the metal roll core base 23 prior to the application of any layers, and shows how the outer circumference of the cylindrical section 22 matches the circumference of the metal roll core base 23.

Figure 5:
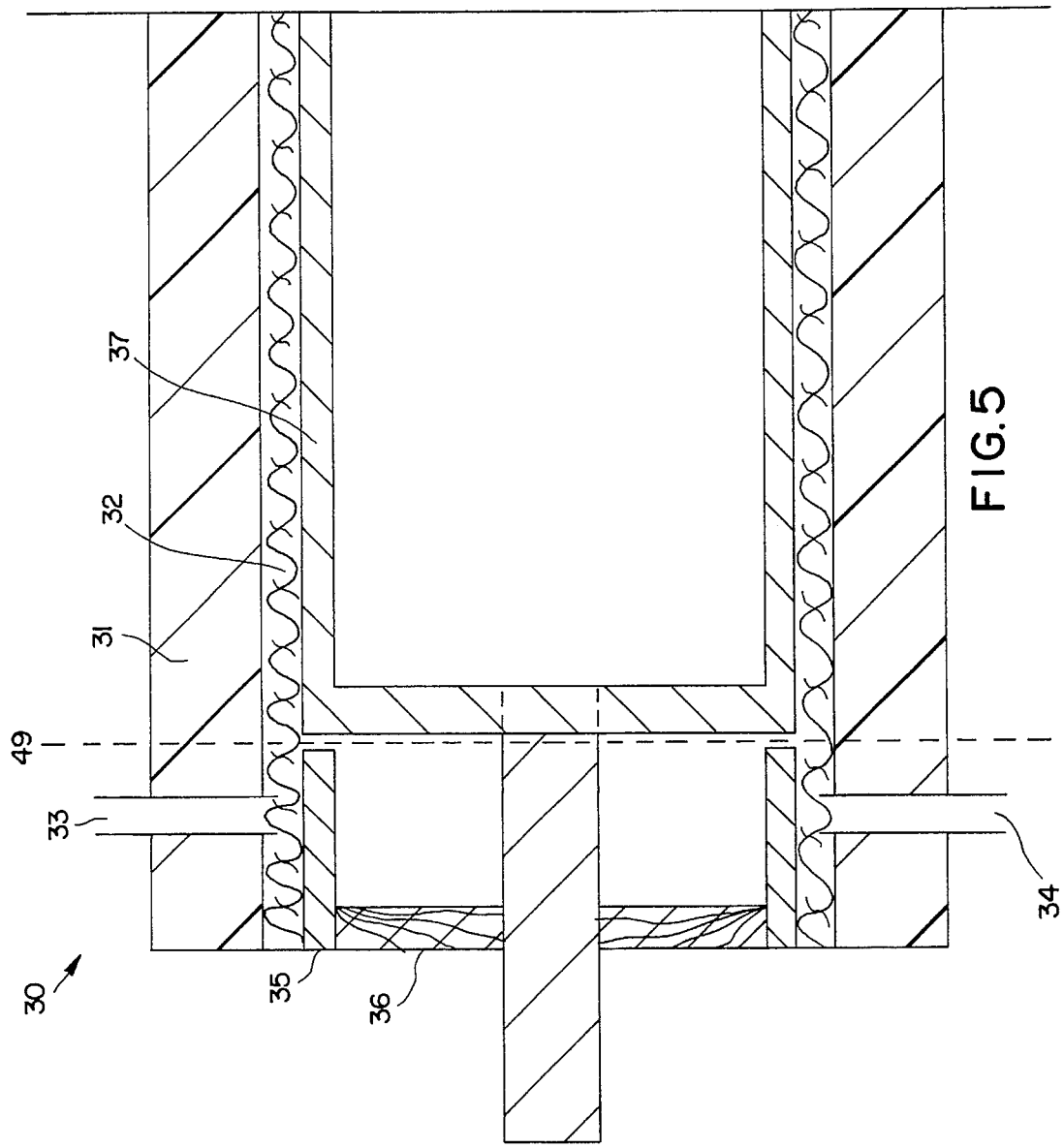
FIG. 5 is a sectional view taken along line 5—5 of FIG. 4 of the covered roll of the present invention further showing the bottom drill sites as they are located within the region defined by the surface of the covered extender assembly.
Figure 6:
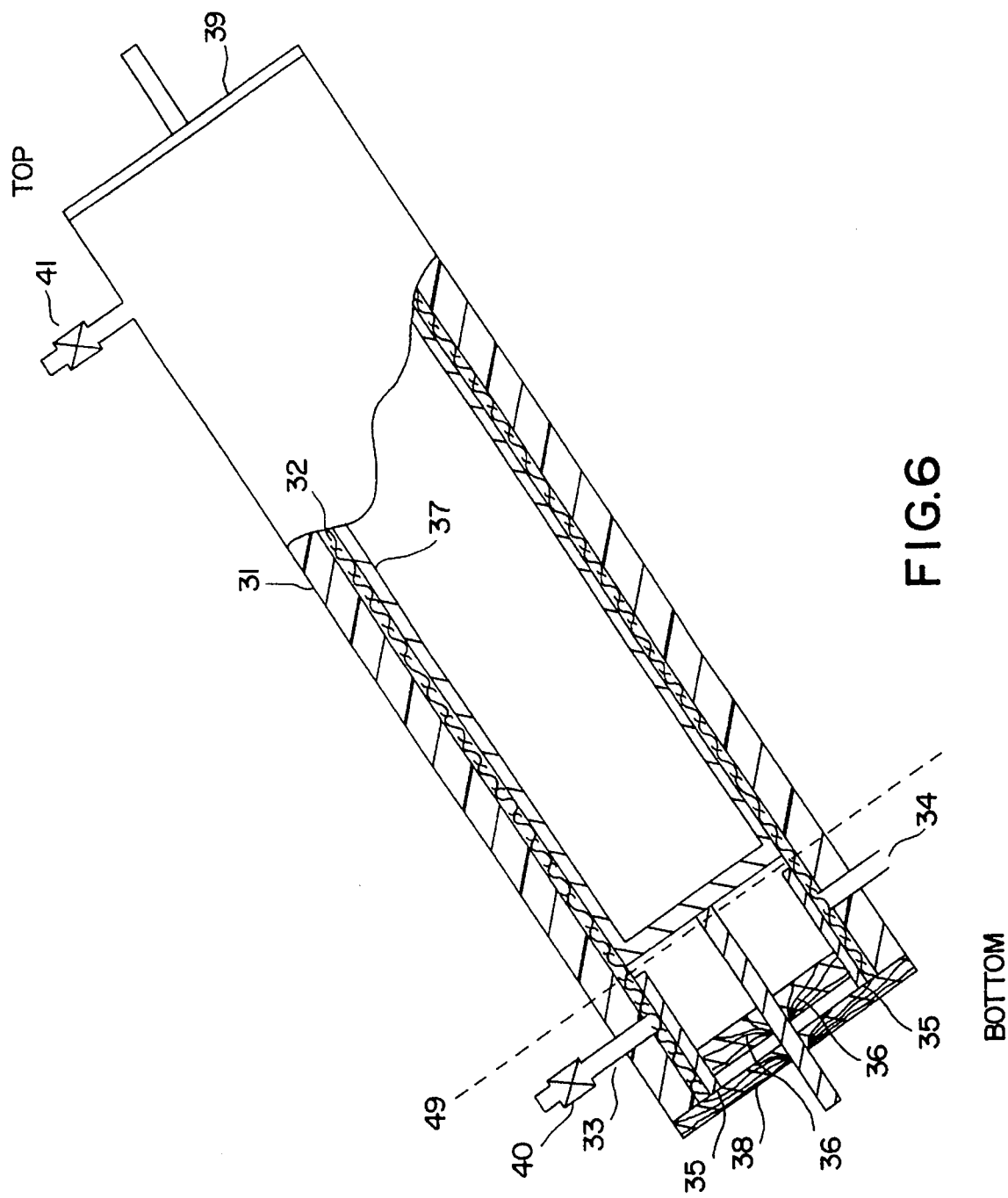
FIG. 6 is a partially sectioned view of an elevated roll manufactured in accordance with the present invention.

After the cover 11 is applied and cured, drill holes can be made in the region of the extender caps. FIG. 5, shows a sectional view of the covered roll 30 of the present invention prior to the injection of filling material into the intermediate compressive layer 32. The drill holes 33 and 34 extend through the cover 31 and into the intermediate compressive layer material 32, and are to be used as a conduit for filling the intermediate layer 32. Phantom lines 49 in FIG. 5 and FIG. 6, further show how the drill holes are located within the region of the covered extender cap assembly comprising the annular ring 36 and cylindrical section 35. As a final step of the process, the now compressed intermediate layer is filled with a thermoset polymer. FIG. 6 shows how this is accomplished by lifting the roll on its bottom end so that it tilts or sits at angle with respect to the horizontal. Then the thermoset can be pumped under pressure into the intermediate compressive layer until the resin flows out of the top taps or spigots. With reference to FIG. 6, this is accomplished by placing gaskets 38 and 39 over each end of the roll. Preferably, the gasket is made out of wood similar to the annular ring described. The thermoset is pumped into through hole 34 until the thermoset extrudes out of valve 40 located at through hole 33. Then, the valve 40 is closed and the thermoset continues to be pumped into through hole 34 until it extrudes out of valve 41 located at the top of the roll. At this point, the intermediate compressive layer is completely filled. All that remains to complete the roll is the cutting of the extender portions of the roll.

After injecting the filling material into the intermediate compressive layer 31 and curing the filler material, the covered extender cap assembly can be removed from the remainder of the roll, for example, by cutting towards the metal roll core base 37 in the vicinity of phantom lines 49 indicated in FIG. 5. Thus, the finished product is a covered roll absent any drill holes. Manufacturing a covered roll with the aforementioned extender cap assemblies also serves the purpose of ensuring that the intermediate layer of the finished role is completely filled with material.

The roll core is a conventional metal roll made of iron or steel. The compressive layer may be, for example, a three dimensional spacer fabric layer 50 having fibers 51 interwoven between a top layer 52 and bottom layer fabric 53 as shown in FIG. 7. The fabric is composed of a suitable material, preferably a synthetic material, such as a polyester, DACRON, or other synthetic, such as NYLON. The preferred fabric is a "Textile Spacing Fabric" that can be purchased from MÜller Textil GmbH, Postfach 31 40 D-5276 Wiehl-Drabenderhöhe, Germany, the details of which are provided in a brochure displaying product number 5556 incorporated herein by reference. Other spacer fabric materials suitable for use include 3D-TEX, by MAYSER GMBH & CO., Lindenberg, Postfach 1362, Germany, and a fiberglass product by PARABEAM Industries, Hoogeindsestraat 49, 5700 AC Helmond, Netherlands.

The polymers can be any polymer normally used in the art and most commonly an epoxy resin that is commercially available. The intermediate layer can be filled with a resin. But the filler material can be a polymer that cures at a lower temperature than the polymer used for the cover. The polymeric is preferably a thermoset or thermoplastic material.

In an exemplary embodiment, the spacer fabric layer is filled with a thermoset or thermoplastic polymer under such conditions, in which the development of higher than desired residual stresses in the cover and also in the spacer fabric layer itself, can be prevented. As an additional aid in reducing residual stresses, such thermoset systems may be utilized for the compressive layer, which have properly designed combined thermal and cure shrinking properties. For base systems which require high temperature resistance, thermoset systems with double curative systems may be used in a way that the glass transition temperature in the base can be adjusted to the required level.

This method is applicable to a versatile range of methods of manufacturing covers like wrapping, filament winding, casting, ribbon flow and extrusion. Also, both thermoplastic and thermoset materials can be used. Hence, the number of processing steps are reduced since there is no need for separate processing of the cover.

The invention is further illustrated by the following non-limited example.

Although the present invention is applicable to originally manufactured rolls which have never been covered, (OEM), for use in mills, the present example is directed to a calender roll which has been removed from a paper mill for purposes of being recovered with a hard, polymeric surface. Initially, after the roll is received in the plant, the old covering is removed by placing the roll in the lathe and removing the worn, damaged covering with a cutting tool. In the standard procedure for refurbishing such rolls, the cutting tool is allowed to scrap away the prior covering allowing a fraction of a millimeter of the prior covering to remain on the steel roll core. Thereafter, the remaining fraction of a millimeter of covering is removed by grinding. The roll cores normally are made of steel but commonly they are formed of cast iron and chilled iron.

After the grinding operation the roll core is grit blasted. Grit blasting produces an activated surface on the metal core to optimize bonding with subsequent non-metallic materials that are to be built up on the roll core during the recovering operations.

After a grit blasted activated surface has been achieved, a protective layer, normally a phenolic resin, is applied to the surface of the roll core to prevent oxidation that would otherwise reduce the optimal bonding of the prepared surface. The protective layer is preferably applied to the roll surface with a brush or sprayed while the roll itself is being rotated in the lathe. The resin primer becomes a protective surface coating when the solvent therein evaporates. A preferred primer is Chemlok 219 from LORD Corporation, U.S.A.

The foregoing pretreatment steps are standard and have been used in the roll covering industry for decades and form no part of the present invention. In accordance with the present invention, however, a spacer material is applied to the surface of the metal roll. The spacer material is maintained on the roll by virtue of a cement material. In accordance with the present invention, FIG. 8 shows how a layer of cement 80 is applied to the surface of the roll, (including the regions of the extender cans as indicated by phantom lines 49), by way of a notched trowel 81 similar to a trowel that is used for setting tile on a surface. The cement that is used is a product sold by 3M Company referred to as a structural cement and sold under the trade name, Scotch Weld XB-7265. It has been found that the cement goes on smoother if the roll is heated to a temperature of about 50° C. This can be accomplished by placing the roll in an oven, or more preferably, by radiating the roll while it is turning on a lathe under an array of infrared heating lamps. When the surface temperature of the roll has reached 50° C., the cement is applied to the roll with a tile trowel while the roll is turning in the lathe. Indeed, it is applied in the same manner as a mason would apply cement to a surface on which tile is to be applied. The cement is configured on a roll in a series of "V's" 82 as shown in FIG. 8. The entire roll is coated with cement in this manner. Once the cement is applied it remains in a tacky state and the roll may be cooled down to room temperature for application of the spacer fabric.

The preferred spacer fabric is a "Textile Spacing Fabric" that can be purchased from MUller Textil GmbH, Postfach 31 40 D-5276 Wiehl-Drabenderhöhe, Germany, the details of which are provided in a brochure displaying product number 5556 incorporated herein by reference. As shown in FIG. 7, this fabric can be thought of as a sandwich formed from a top and bottom woven surface with a filler weaved in between. This fabric is preferred because it is very compressible under pressure and yet rigid enough to be wrapped in subsequent steps. The material is cut and pieced on a roll similar to a carpet being glued to a floor. The material is purchased in widths of 1.5 meters so that 4 pieces are needed to cover a 6 meter roll. At this stage the cement has no gluing capability because it is uncured. So, the seam of the spacer fabric has to be sewn. The seam is simply sewn with a polyester thread which is the same material as the spacer fabric. The butt edges are also sewn together.

After the textile spacing fabric has been sewn and secured to the roll, it is coated with a coating layer whose purpose is to prevent impregnation of subsequent resin material into the hollow cavities of the spacing fabric. To accomplish this a non-woven tape impregnated the resin is wrapped around the textile spacing fabric while the roll is rotated on a lathe. The non-woven fabric that is used is called Reemay and is obtained from Nordlys SA, Z1 de la Blanche, Maison 59270, Bailleul, France. It is a fabric made from fibers of polyester. Prior to being applied to the roll it is run through a dipping trough of epoxy resin. The epoxy resin is a Bisphenol A type of epoxy resin, DER 331 from Dow. The two part components that are necessary to produce the cured resin are fed into the dipping tank. The dipping tank also contains an aliphatic amine curing agent. After the roll has been wrapped with the epoxy resin impregnated non-woven material, the resin in the material is allowed to gel, but not cure. This is accomplished by allowing the roll to turn on the lathe under infrared lamps for 5–7 hours to produce a surface temperature of about 55° C.

At this stage the gel prevents the liquid from the next step from penetrating through it and into the textile spacing fabric while at the same time being compressible enough to allow the shrinking of the next layer to be absorbed by the spacing fabric.

Figure 9:
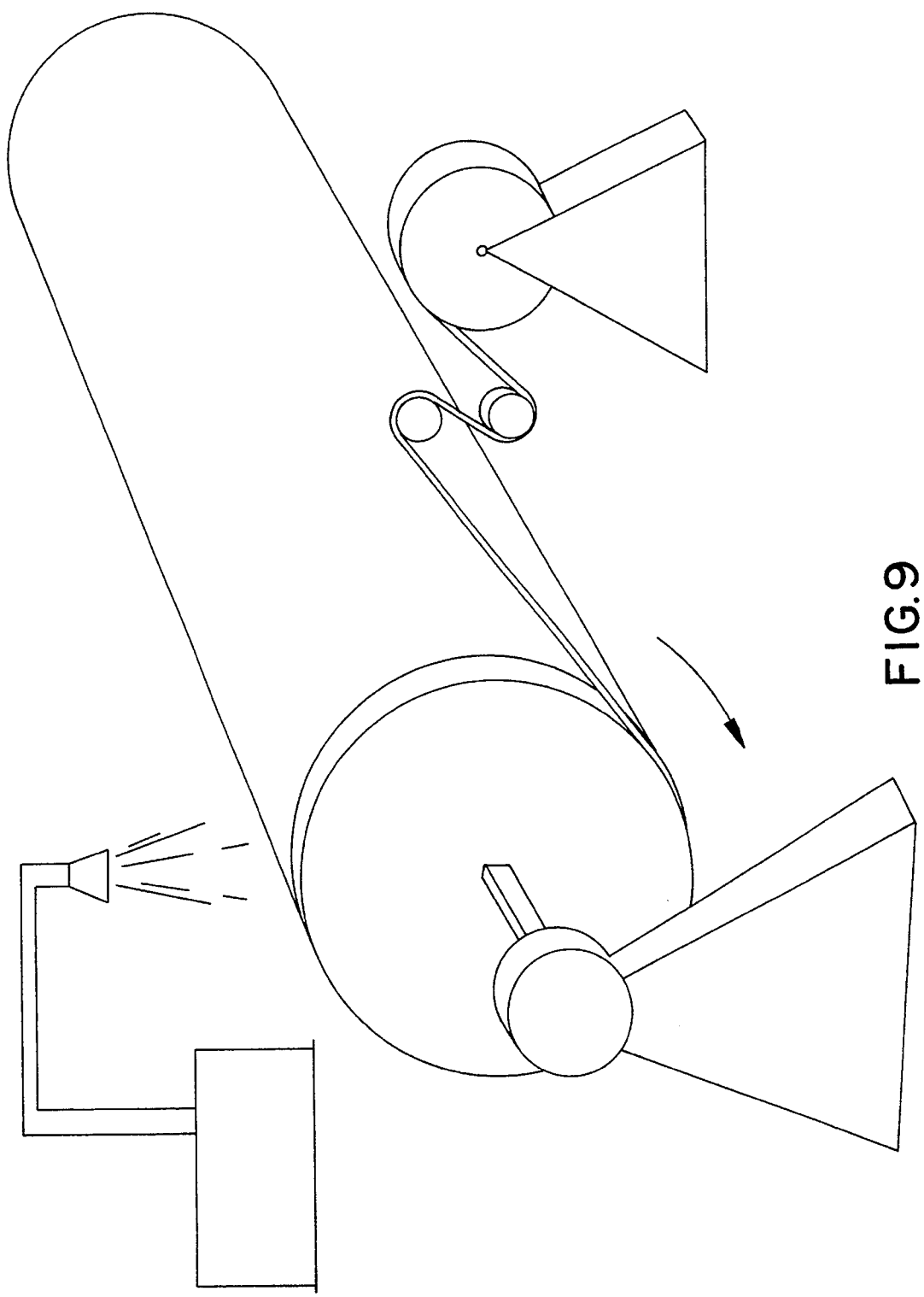
FIG. 9. is a perspective view of the manufacturing process in accordance with the present invention in which a cover is applied as a layered resin impregnated fabric; and, FIG. 10 is a quarter section of a finished covered roll manufactured in accordance with the present invention which shows a covered roll having a cover with a beveled edge and an intermediate spacer fabric layer filled with a resin.

The next step in the procedure is application of the top stock, and in this example, it is applied by a wrapping procedure as shown in FIG. 9. In this step another non-woven material is utilized. This non-woven material, however, is formed of Kevlar from DuPont, and is obtained from Technical Fibre Products, Limited, Burnesside Mills, Kendall, Cumbria LA9 6PZ England. The non-woven fabric used has a specification of 25 g/m$^2$. Here, again, the epoxy is Bisphenol A, and is the same epoxy used to form the protective gel coat with a different curing agent. This time the curing agent is an aromatic amine, DETDA.

The top stock is wrapped in this manner. The wrapping process is continued back and forth to achieve a specified thickness which in this case is a thickness of 15 mm which takes place in 12–15 passes with a 50% overlap. The non-woven fabric is 100 mm wide. The next step in the process is to gel the top layer so that it is non-flowing. This is done by heating the roll under infrared lamps while the roll rotates for 15 hours at 70° C. After it is gelled the ends of the coating are cut to provide an even coating, (trimmed). The trimming is done right down to the metal core. This is done with a cutting tool. The entire roll is the delivered to an oven. It is cured under the following curing cycle: 8 hours at 80° C., followed by 8 hours at 90° C., followed by 8 hours at 100° C., and finally, followed by 16 hours at 110° C. The roll is then delivered to another oven for its cool down cycle. It is allowed to cool for 10 hours. The roll is then taken to the production floor where the surface is prepared, normally by grinding it to a nearly smooth, but unfinished surface.

Prior to finishing the surface of the cover layer, the roll is prepared for the filling of the intermediate compressive layer by drilling holes through the top stock into the interior of the textile spacing fabric. Preferably, this is accomplished by drilling 3 holes into the ends of the roll at the locations shown in FIG. 6, The resin is inserted into the cavity of the intermediate spacer fabric layer through the bottom hole 34 until it squirts out the bottom hole 33 on the opposite side through valve 40. When this occurs, valve 40 is closed and the cavity is filled with resin until it flows out of valve 41. Again, it is the same resin system that is used for sealing the top layer for the spacing fabric, i.e., Bisphenol A epoxy resin with an aliphatic amine curing agent. Prior to the insertion of the resin, the entire roll assembly is preheated in an oven to a temperature of 75° C. The entire roll is then cured in an oven at 75° C. for 24 hours.

During the entire processing of this roll an extender 35 can has been placed over both ends of the roll. Each extender can has an annular ring 36 that slips over the axial of the roll mating and extending the metal cylindrical surface outward along its longitudinal axis. Cylindrical cans are placed on both ends of the axle. Ideally this is done by having a wooden donut 36 where the holed donut fits over the axle of the roll and then this provides the edge of the can which extends the roll covering surface. It is important to note that the roll core metal base 37 and the extender cans 35 are treated with the covering processes herein described. Thus, the roll and its extender cans are covered with the intermediate spacer fabric layer and cover at the end of the process. The use of extender creates an additional void to be filled during the step of filling the intermediate layer, thus guaranteeing the complete filling of the intermediate layer. Furthermore, since the holes are drilled in the region of the extender cans, the covering can be cut interior to the boundary of the holes thereby presenting a finished product.

Figure 10:
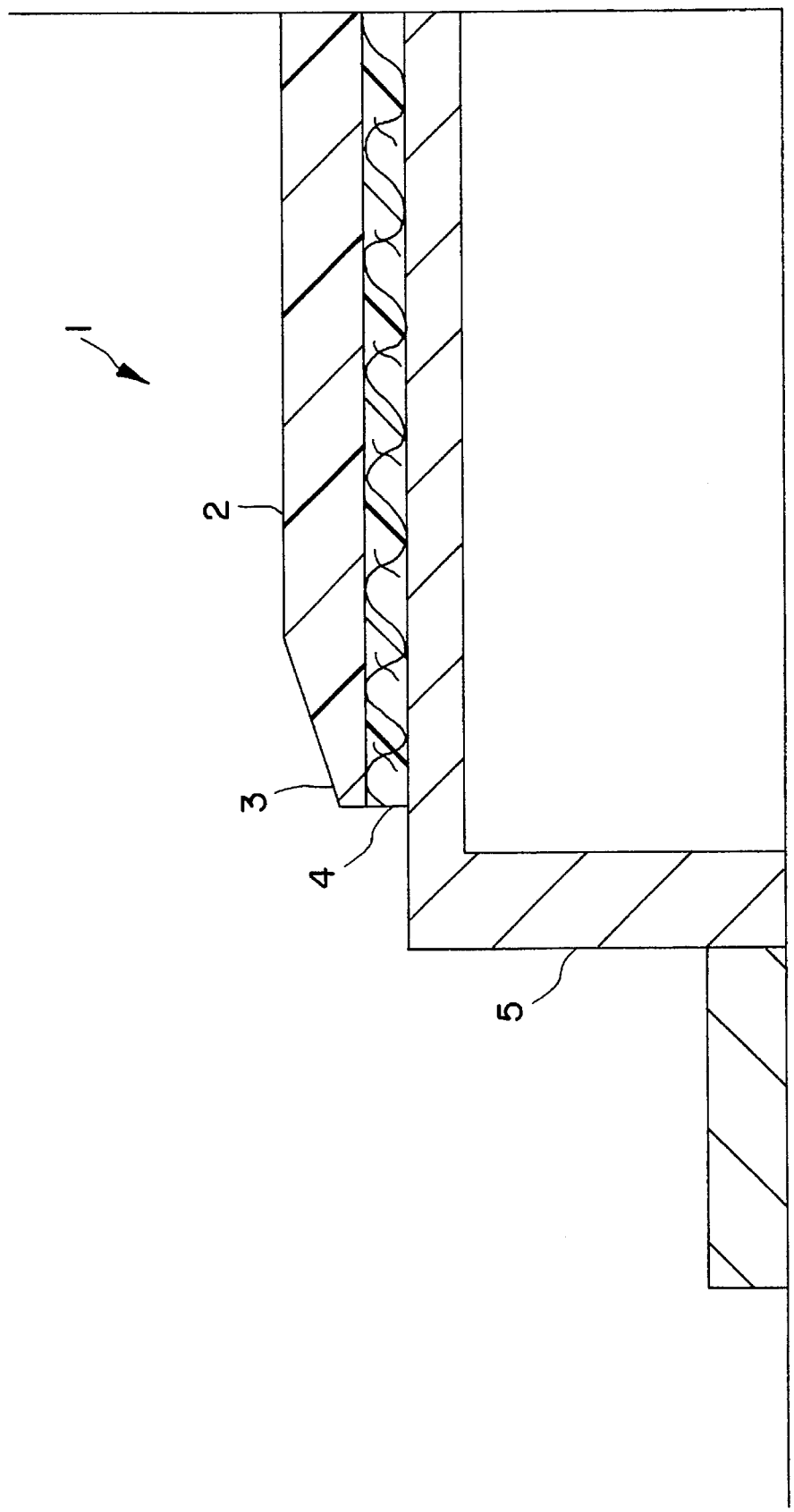

The next part of this example is to cut through the various layers to the actual metal roll followed by the removal of the two end pieces. The cutting is done interior to the location of the holes to produce a roll with a finished covering. As final steps in the process, the cover is finish ground and the edges are treated to form a slight bevel which is currently known in the art. In accordance with the above example, FIG. 10 shows a covered roll 1 having a cover 2 with a beveled edge 3 and a filled intermediate spacer fabric layer 4. The filled intermediate spacer fabric layer 4 and the cover 2 have been cut down to the metal roll core 5. The extender can assembly, (not shown), has been removed.

In the foregoing specification, the invention has been described with reference to specific exemplary embodiments thereof. It will, however, be evident that various modifications and changes may be made thereunto without departing from the spirit and scope of the invention as set forth in the appended claims. The drawing and specification are, accordingly, to be regarded in an illustrative rather than in a restrictive sense.

We claim:

1. A covered roll comprising:

a roll core base;

a compressive layer having a top surface and a bottom surface and a void space therebetween, said compressive layer circumferentially surrounding said roll core base; and a cover, said circumferentially surrounding compressive layer;

said compressive layer being rigid enough to support said surrounding cover and compressible enough to change in volume in response to the volume changes which occur in said cover as a result of the stresses created during processing.

2. The covered roll of claim 1, wherein said compressive layer comprises a fabric having a fibrous top surface and a fibrous bottom surface, said top and bottom surfaces being structurally supported by fibers extending from said top surface to said bottom surface.

3. The covered roll of claim 1, wherein the void space of said compressive layer is filled with an epoxy resin and cured at a temperature lower than the temperature at which said cover is cured.

4. The covered roll of claim 1, wherein the void space of said compressive layer is filled with a thermoset.

5. The covered roll of claim 1, wherein the void space of said compressive layer is filled with an elastomer.

6. The covered roll of claim 1, wherein the roll further comprises a multi-layered structure, said structure including one or more intermediate compressive layers.

7. In a process for covering a roll in which a relatively hard covering material is applied over the roll core base wherein the improvement comprises spacing the cover from the roll core base to provide a circumferential gap intermediate between the core and the cover and filling the gap between the core and the cover after the cover has been applied over the core.

8. The process of claim 7 wherein the gap is formed by a spacing material.

9. The process of claim 7 wherein the gap is filled with the spacer material in place.

10. The process of claim 9 wherein the filling material is polymer.

11. The process of claim 7 wherein the cover is applied to the compressive layer as a resin impregnated tape as the roll is rotated.

12. A method of making a covered roll, said method comprising the steps of:

applying a compressive layer over a roll core base, the compressive layer having a top surface and a bottom surface and a void space therebetween, the compressive layer being compressible enough to change in volume as a result of the stresses created during processing;

applying a cover material over the compressive layer to form a covered roll;

heat treating the roll to cure the cover material under such conditions which allow the void space in the compressive layer to absorb the stresses.

13. A method of making a covered roll, said method comprising the steps of:

applying a compressive layer over a roll core base, the compressive layer having a top surface and a bottom surface and a void space therebetween, said compressive layer being compressible enough to change in volume as a result of the stresses created during processing;

applying a cover material over the compressive layer to form a covered roll;

heat treating the roll to cure the cover material under such conditions which allow the void space in the compressive layer to absorb the stresses; and, filling the remaining void spaces of the compressive layer with a material to create a solid roll.

14. The method of making a covered roll of claim 13, further comprising the step of curing the filler material at a lower temperature than the cure temperature of the covering material so as to create a solid roll.

15. The method of making a covered roll of claim 13, wherein prior to said step of applying the compressive layer to the roll core base, said method comprises the additional steps of:

locating an extender cap assembly on each end of the roll core base, said assembly comprising a substantially circular plate and a cylindrical section having an outer circumference substantially the same as the outer circumference of the roll core base;

and after said steps of applying and curing said coating material, the additional steps of, drilling holes into the roll which extend through the cured coating material and into the compressive layer;

sealing both roll ends with a gasket;

injecting a filler material through the holes and into the compressive layer;

curing the filler material at a lower temperature than the cure temperature of the covering material so as to create a solid roll; and, severing the outer ends of the finished roll so as to remove the extender assemblies.

16. The method of making a covered roll of claim 13, wherein said step of drilling further includes inserting valves into the holes.

17. The method of making a covered roll of claim 13, wherein said step of injecting further includes tilting the roll at an angle with respect to the horizontal.

18. The method of making a covered roll of claim 13, wherein said step of applying a cover material further comprises, impregnating a non-woven cloth with resin, and applying the impregnated cloth to the compressive layer.

19. The method of making a covered roll of claim 13, wherein prior to said step of applying the cover material to the compressive layer, said method comprises the additional step of applying a coating layer to said compressive layer, said coating layer being impervious to resin materials.

20. The method of making a covered roll of claim 13, said applying step further comprising the step of wrapping a non-woven tape impregnated with resin around the compressive layer.

21. A method of making a covered roll comprising the steps of:

applying one or more compressive layers to a roll core base;

coating the outer surface of the compressive layer with an ingredient which renders said layer impervious to polymer forming materials;

applying a polymer coating material to the now impervious compressive layer to form a covered roll; and, heat treating the covered roll to cure the polymer;

said compressive layer being allowed to change in volume as a result of the stresses exerted during processing.

22. The method of making a covered roll according to claim 21, further comprising the steps of: predetermining the amount of shrinkage that will occur during the manufacture of the roll, and applying enough compressive layers so that as the stresses exerted during processing change the volume of the roll, said compressive layers have such a depth so as to absorb said amount of shrinkage.

23. A method of making a covered roll comprising the steps of:

applying a compressive layer to a roll core base so as to circumferentially surround said roll core, said compressive layer comprising a removable material and being compressible enough to change in volume as a result of the stresses created during processing while also being rigid enough to support a coating material;

applying a coating material to the compressive layer;

heat treating the roll to cure said coating material;

removing the removable material; and, filling the resulting gap layer with a material to create a solid roll.

24. The method of making a covered roll according to claim 23, wherein said removable material has a melting point less than the cure temperature of the cover material, and wherein after said applying step, said method further comprising the step of removing the material by melting during the cure period of the coating material so as to create a circumferential gap layer.

25. The method of making a covered roll according to claim 23, wherein said gap layer is filled with an epoxy resin.

26. The method of making a covered roll according to claim 23, wherein said filling step further comprises filling the gap layer with a filler material selected from the group consisting of a thermoplastic, a thermoset, an epoxy resin and an elastomer.

27. The method of making a covered roll according to claim 23, further comprising the step of curing the filler material at a lower temperature than the cure temperature of the cover.

* * * * *